Patented Jan. 22, 1946

2,393,249

UNITED STATES PATENT OFFICE 2,393,249

SULPHITED CATION EXCHANGERS

Eric Leighton Holmes, London, England, assignor to The Permutit Company, New York, N. Y., a corporation of Delaware No Drawing. Application September 5, 1942, Serial No. 457,520. In Great Britain September 10, 1941

13 Claims. (Cl. 252—193)

This invention relates to improved cation exchangers, the preparation thereof and the treatment of liquids therewith.

A number of organic cation exchange materials have been developed fairly recently which have numerous advantages over the older types of mineral zeolites made from glauconite and other siliceous minerals. Since these new exchange materials are non-siliceous, there is no danger of imparting silica to a liquid being treated. Also, they can be regenerated successfully with acids as well as with solutions of salts.

One class of such organic cation exchange materials is the group prepared by treatment of an organic carbonizable substance such as anthracite coal, bituminous or semi-bituminous coal, lignite, products derived from the waste liquors of the sulphite cellulose process, sludges or other residues derived from the purification of petroleum oils, and asphalts with strong sulphating or sulphonating agents such as concentrated sulphuric acid, fuming sulphuric acid, chlorosulphonic acid, sulphur trioxide gas or the like.

The reaction taking place in the preparation of these products probably involves oxidation as well as sulphation or sulphonation.

Another class of such organic cation exchangers is the synthetic resin products. A number of such resins have been produced heretofore which have cation exchanging properties, including resins prepared by condensation of an aldehyde with a tannin, i. e., either a natural or a synthetic polyhydric phenol. These and other such resins have been prepared and then treated with a sulphating or sulphonating agent or, in some instances, the polyhydric phenols have been sulphonated previous to condensation with an aldehyde. Various other resins are known for use as cation exchangers in which $SO_3H$ groups are provided in the resin by treatment with a sulphating or sulphonating agent, either during the preparation of the resin, or after it has been formed. Still other cation exchange resins have been prepared by reaction of an aldehyde, sulphite and a monohydroxybenzene.

One object of my invention is the provision of cation exchangers of the foregoing types having an increased capacity for cation exchange reactions.

A further object resides in the improvement of organic cation exchangers that contain $SO_3H$ groups by a treatment of such exchangers with a soluble compound of sulphur dioxide.

Other objects will be explained or will be apparent from the following description of my invention.

I have found that these sulphated or sulphonated organic cation exchangers or exchange resins prepared by sulphiting during their formation can be given substantially higher capacities for performing cation exchange reactions without injuring their other properties, by a treatment of such materials with a solution of a soluble compound of sulphur dioxide. Sulphurous acid or the various sulphites are satisfactory for this purpose, including the common sulphites such as alkali sulphites, the alkali bisulphites, and other compounds such as $Na_2S_2O_5$ which is known as sodium pyrosulphite or sodium meta bisulphite.

The cation exchanger treated may have been sulphated or sulphonated just prior to sulphiting or as a preliminary step in its preparation. Also, the sulphating or sulphonating treatment may have been applied either to create or increase its exchange capacity. In the case of resins, the resinous product may have been sulphated or sulphonated after formation of the resin, during its formation or one or more of the ingredients may have been sulphated or sulphonated prior to preparation of the resin. Some resins, in fact, are improved physically by a sulphating or sulphonating treatment, and these physical improvements such as a reduction in their tendency to swell, are not impaired by a subsequent sulphiting treatment.

The sulphiting treatment of this invention produces a substantial increase in the cation exchange capacity of these materials, regardless of whether they are regenerated with an acid or a salt when used for carrying out the cation exchange reactions. A product which contains hydroxyl groups in addition to $SO_3H$ groups, such as is obtained by an oxidizing sulphation or sulphonation of coal or other organic material, is particularly advantageous for treatment according to this invention.

The material treated with sulphurous acid or sulphite may be in any suitable condition when subjected to the treatment. It does not appear to make any substantial difference whether the material treated contains exchangeable hydrogen or an exchangeable cation such as sodium, magnesium or calcium. It is more convenient, however, to have only one kind of cation present during the sulphiting.

Ordinarily, the treatment with the sulphiting reagent is advantageously carried out at an elevated temperature of the order of 100 to 200° C., and it is desirable, although not essential, to carry out the reaction under pressure as in an autoclave or similar apparatus. For most purposes, a reaction temperature of 110 to 130° C. is particularly satisfactory.

The sulphated or sulphonated cation exchange material may be simply mixed with a moderately strong aqueous solution of the sulphiting reagent and heated for a period of time at the desired temperature, either under a reflux condenser or in a suitable pressure vessel. At the end of the reaction period, the exchange product is washed with water, regenerated with a dilute solution of acid or a suitable salt solution and is then ready for immediate use as a high capacity cation exchange product.

Other reagents such as aldehydes may be present during the sulphiting reaction, although under most conditions, I have found that somewhat better increases in ion exchange capacity are obtained if an aldehyde is not used.

The invention is further illustrated by the following specific examples, although it is to be understood that the invention is not limited to the particular procedures or details of these examples.

*Example I.*—200 parts by weight of bituminous coal were sulphated or sulphonated with 600 parts of 20% fuming sulphuric acid, then washed, neutralized with dilute sodium carbonate solution and dried.

A measured portion of this product was placed in a tube and measured quantities of hard water passed through it until hardness appeared in the effluent. The exchange product was then regenerated with sodium chloride solution and the procedure repeated for a number of cycles. The product was then similarly tested for exchange capacity using a dilute solution of sulphuric acid as the regenerant. Results of these tests are shown in the table below.

The sulphated or sulphonated coal product in a sodium exchanging condition was then heated under a pressure of about 2.7 atmospheres at a temperature of 130° C. for three hours with about twice its weight of a 30% aqueous solution of sodium pyrosulphite ($Na_2S_2O_5$). The sulphited product was then washed and tested for exchange capacity in both the sodium and hydrogen cycles. The exchange capacities of the products before and after the sulphiting treatment are shown in Table I.

*Example II.*—60 parts of bituminous coal were sulphated or sulphonated with 180 parts of 20% fuming sulphuric acid and the product was tested as in Example I. This product was then heated under a reflux condenser at a temperature of 108–110° C. for three hours with about three times its weight of a 33% aqueous solution of sodium sulphite ($Na_2SO_3$). After washing this product was again tested for exchange capacity, the capacities before and after the sulphiting treatment being shown in Table I.

*Example III.*—A cation exchange resin was prepared by mixing 300 ml. of 40% formaldehyde solution with a solution of 200 g. of quebracho tannin in one liter of water, and 20 g. of NaOH as a catalyst. This mixture was heated on a water bath for one hour until it set to a gel, and the gel was then broken up and dried at 80–90° C. The dried particles were ground to 20–30 mesh and sulphated or sulphonated with 20% fuming sulphuric acid using two parts of acid by weight to one part of the resin. The sulphated or sulphonated resin after washing and neutralizing with sodium carbonate solution was dried and tested as in Example I for exchange capacity.

A portion of the sulphated or sulphonated resin in the sodium exchanging condition was sulphited by heating it at a temperature of 130° C. under a pressure of about 2.7 atmospheres for three hours with about twice its weight of a 30% aqueous solution of sodium pyrosulphite ($Na_2S_2O_5$). The sulphited product was again tested for exchange capacity.

In the following table, the exchange capacity test data for each of the foregoing examples are summarized with the individual capacities set forth in terms of milliequivalents per gram (meq./g.) and milliequivalents per liter (meq./l.) of exchange material when regenerated with sodium chloride solution (sodium cycle) and when regenerated with dilute sulphuric acid (hydrogen cycle). The density, given in terms of grams per liter (g./l.), is expressed on the dry (105° C.) basis, and was determined by backwashing and draining a bed of granular material of known weight in a calibrated tube.

Table

| Example No. | Exchange material | Density, g./l. | Hydrogen meq./g. | Cycle, meq./l. | Sodium, meq./g. | Cycle, meq./l. |
|---|---|---|---|---|---|---|
| 1 | Before sulphiting | 333 | 0.65 | 217 | 1.02 | 338 |
| 1 | After sulphiting | 330 | 0.84 | 276 | 1.12 | 368 |
| 2 | Before sulphiting | 335 | 0.82 | 269 | 1.01 | 341 |
| 2 | After sulphiting | 350 | 0.93 | 324 | 1.19 | 415 |
| 3 | Before sulphiting | 307 | 0.37 | 112 | 0.88 | 270 |
| 3 | After sulphiting | 318 | 0.79 | 252 | 1.26 | 400 |

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of increasing the ion exchange capacity of cation exchangers comprising treating an organic cation exchanger containing sulphonic groups with a water soluble compound of sulphur dioxide at a temperature of about 100–200° C.

2. A process of increasing the ion exchange capacity of cation exchangers comprising reacting a member of the group consisting of sulphated organic cation exchangers and sulphonated organic cation exchangers with a solution of a compound of sulphur dioxide at a temperature between about 100° and about 200° C.

3. In a process of increasing the ion exchange capacity of cation exchangers, the step of reacting a cation exchanger comprising a member of the group consisting of sulphated and sulphonated members of the coal family with an aqueous solution of a compound of sulphur dioxide at a temperature between about 100° and about 200° C.

4. In a process of increasing the ion exchange capacity of cation exchangers, the step of reacting a cation exchanger comprising a member of the group consisting of sulphated bituminous coals and sulphonated bituminous coals with an aqueous solution of a soluble sulphite at a temperature of between about 100° and about 200° C.

5. In a process of increasing the ion exchange capacity of cation exchangers, the step of reacting a cation exchanger comprising a member of the group consisting of sulphated resins and sulphonated resins with an aqueous sulphite solution at a temperature between about 100° and about 200° C.

6. In a process of increasing the ion exchange capacity of cation exchangers, the step of reacting a cation exchange sulphited resin with an aqueous sulphite solution at a temperature between about 100° and about 200° C.

7. An organic cation exchanger having a high capacity for exchange reactions prepared by treatment of a cation exchanger containing sulphonic groups with an aqueous solution of a sulphite at a temperature between about 100° and about 200° C.

8. An organic cation exchanger having a high capacity for exchange reactions prepared by treatment of a cation exchanger of the group consisting of sulphated carbonizable substances and sulphonated carbonizable substances with an aqueous solution of a sulphite at a temperature between about 100° and about 200° C.

9. An organic cation exchanger having a high capacity for exchange reactions prepared by treatment of a cation exchanger of the group consisting of sulphated and sulphonated members of the coal family with an aqueous solution of a compound of sulphur dioxide at a temperature between about 100° and about 200° C.

10. An organic cation exchanger having a high capacity for exchange reactions prepared by reaction of a member of the group consisting of sulphated coals and sulphonated coals with an aqueous solution of a sulphite at a temperature of between about 100° and about 200° C.

11. An organic cation exchanger having a high capacity for exchange reactions prepared by treatment of a member of the group consisting of sulphated cation exchange resins and sulphonated cation exchange resins with a solution of a compound of sulphur dioxide at a temperature between about 100° and about 200° C.

12. An organic cation exchanger having a high capacity for exchange reactions prepared by reaction of a cation exchange resin treated with a member of the group consisting of sulphating reagents and sulphonating reagents during its preparation with a solution of a compound of sulphur dioxide at a temperature between about 100° and about 200° C.

13. An organic cation exchanger having a high capacity for exchange reactions comprising a cation exchange resin prepared by treatment with a sulphite that has been reacted thereafter with a solution of a compound of sulphur dioxide at a temperature between about 100° and about 200° C.

ERIC LEIGHTON HOLMES.